United States Patent [19]

Yamada

[11] Patent Number: 5,173,892
[45] Date of Patent: Dec. 22, 1992

[54] DATA PROCESSING APPARATUS WITH REPLACEABLE MEMORY

[75] Inventor: Shigeto Yamada, Nagoya, Japan

[73] Assignee: Brother Kogyo Kabushiki Kaisha, Nagoya, Japan

[21] Appl. No.: 647,370

[22] Filed: Jan. 29, 1991

[30] Foreign Application Priority Data

Mar. 1, 1990 [JP]  Japan ................................. 2-50429

[51] Int. Cl.$^5$ .............................................. G11B 5/02
[52] U.S. Cl. ....................................... 369/53; 369/54; 400/692
[58] Field of Search ................. 400/692; 360/14.1, 94, 360/137; 369/32, 54, 53

[56] References Cited

U.S. PATENT DOCUMENTS

| | | | |
|---|---|---|---|
| 4,338,644 | 7/1982 | Staar | 360/69 |
| 4,578,722 | 3/1986 | Lovgren | 360/60 |
| 4,818,131 | 4/1989 | Sakai | 400/63 |

FOREIGN PATENT DOCUMENTS 188086  8/1987  Japan ................................. 400/719

*Primary Examiner*—David A. Wiecking
*Assistant Examiner*—Steven S. Kelley
*Attorney, Agent, or Firm*—Oliff & Berridge

[57] ABSTRACT

A data processing apparatus having an input device for inputting characters composing document data and a title name for each document, a recording medium removably loaded for storing thereon document data and the title name(s) of the document data in a correlated relationship, a display device for displaying information document data and information related thereto, a display controller for reading the title names from the recording medium and controlling the display device to display the read title names, a detecting device for detecting whether or not the recording medium is newly loaded, and an instructing device for instructing the display controller to control the display device to display title names read from a newly loaded recording medium after the recording medium is newly loaded based upon detection by the detecting device. Accordingly, when the recording medium is newly loaded into the data processing apparatus, and the loading is detected by the detecting device, the display controller, in accordance with an instruction developed by the instructing device, reads the title names from the recording medium and controls the display device to display the title names.

9 Claims, 12 Drawing Sheets

FIG.11

DATA PROCESSING APPARATUS WITH REPLACEABLE MEMORY

BACKGROUND OF THE INVENTION

1. Field of the Invention

This invention relates to a data processing apparatus, and more particularly to a data processing apparatus wherein a title name of a document stored in a replaceable memory medium is displayed.

2. Description of the Related Art

Generally, an English word processor or a Japanese word processor includes as standard equipment a display unit and a recording medium drive unit, such as for 5¼" or 3½" diskettes, into which a recording medium is removably loaded so that data of a plurality of documents may be stored on the recording medium together with the title names assigned to the documents.

When data of a desired document, stored on the recording medium is to be edited or printed, title names of all documents stored on the recording medium are first displayed on the display unit in order to select the title name of the desired document. If the desired title name is not displayed, then the recording medium is replaced by another recording medium, and a basic menu display is used to cause the display unit to display title names of documents stored on the new recording medium. If the desired title name is again not displayed, then the procedure is repeated until the desired title name is displayed.

With such conventional word processors, complicated key operations are required to cause, each time a recording medium is replaced, the title names of the documents stored on the newly loaded recording medium to be displayed. This is a disadvantage in that it is burdensome to the operator.

SUMMARY OF THE INVENTION

It is an object of the present invention to provide a data processing apparatus which automatically displays, in response to replacing a recording medium, the title names of the documents stored on the newly loaded recording medium.

According to the present invention, there is provided a data processing apparatus, comprising: input means for inputting characters composing document data and a title name of the document; recording medium removably loaded for storing thereon document data and the title name of the document data in a correlated relationship; display means for displaying information of the document data; display controlling means for reading out the title name from the recording medium and controlling the display means to display the read title name; detecting means for detecting whether or not the recording medium is newly loaded; and instructing means for instructing the display controlling means to control the display means to display the title names read from the newly loaded recording medium after loading as a result of the detection by the detecting means. The number of actual title names displayed is a function of the number of documents on the recording medium and the size of the display means.

Accordingly, when the recording medium is newly loaded into the data processing apparatus, such loading is detected by the detecting means. Upon such detection, the display controlling means, in accordance with an instruction developed from the instructing means, reads the title names from the recording medium and controls the display means to display the title names.

With the data processing apparatus according to the present invention, since it comprises the detecting means and the instructing means, when it is detected that the recording medium is loaded, the title names on the thus loaded recording medium are automatically displayed. Accordingly, even though no key is operated for the display of the title names, the title names stored in the recording medium are displayed each time a recording medium is newly loaded. Consequently, a search through multiple recording medium for a title can be done easily and quickly. Thus, the operation of the word processor is improved significantly.

BRIEF DESCRIPTION OF THE DRAWINGS

FIGS. 4 (*a*), 4 (*b*) and 5 to 10 are flow charts showing an outline of a disk access controlling routine.

DESCRIPTION OF THE PREFERRED EMBODIMENT

In the following, an embodiment of the present invention will be described with reference to the drawings. In the present embodiment, the invention is applied to an English word processor using a disk drive having a floppy disk as the preferred recording medium.

Figure 1:
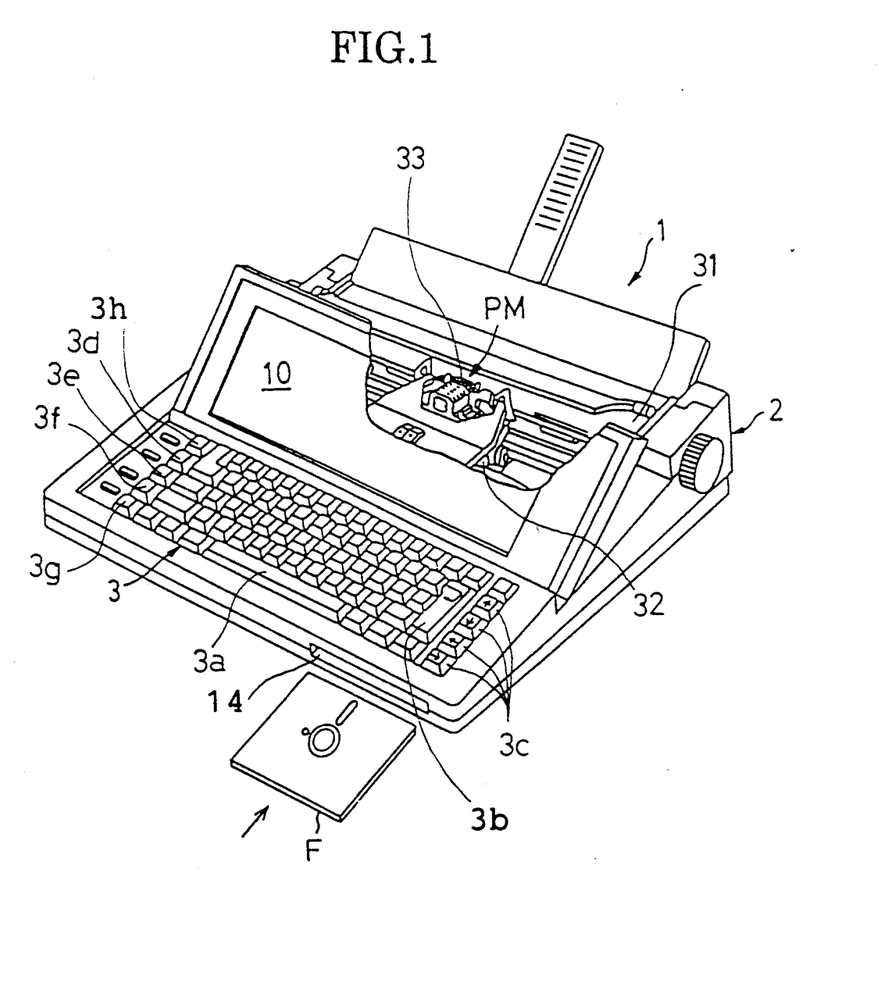
FIG. 1 is a perspective view of a word processor.

Referring to FIG. 1, a keyboard 3 is disposed at a front portion of a body frame 2 of a word processor 1 and a printing mechanism PM of the font wheel type is disposed in the body frame 2 rearwardly of the keyboard 3. A liquid crystal display 10 which can display up to 14 lines of characters and/or symbols thereon is disposed behind the keyboard 3.

The keyboard 3 has various keys including a large number of character keys comprising alphabet keys, numeral keys and symbol keys, a space key 3*a*, a return key 3*b*, four cursor moving keys 3*c* for moving a cursor on the liquid crystal display 10 and various function keys, similar to those found on a conventional word processor keyboard. The present keyboard 3, however, includes several additional keys including a title name display key 3*d* for causing the display 10 to display thereon all title names stored on a floppy disk F loaded in a floppy disk drive unit FD (refer to FIG. 2), a copy key 3*e* and a delete key 3*f* for causing document data of the floppy disk F to be copied and deleted, respectively, and a cancel key 3*h* for stopping some control processing ongoing in the word processor 1.

The printing mechanism PM includes a platen 31, a carriage 32, a font wheel 33 and has a construction such as disclosed, for example, in U.S. Pat. No. 4,818,131.

Figure 2:
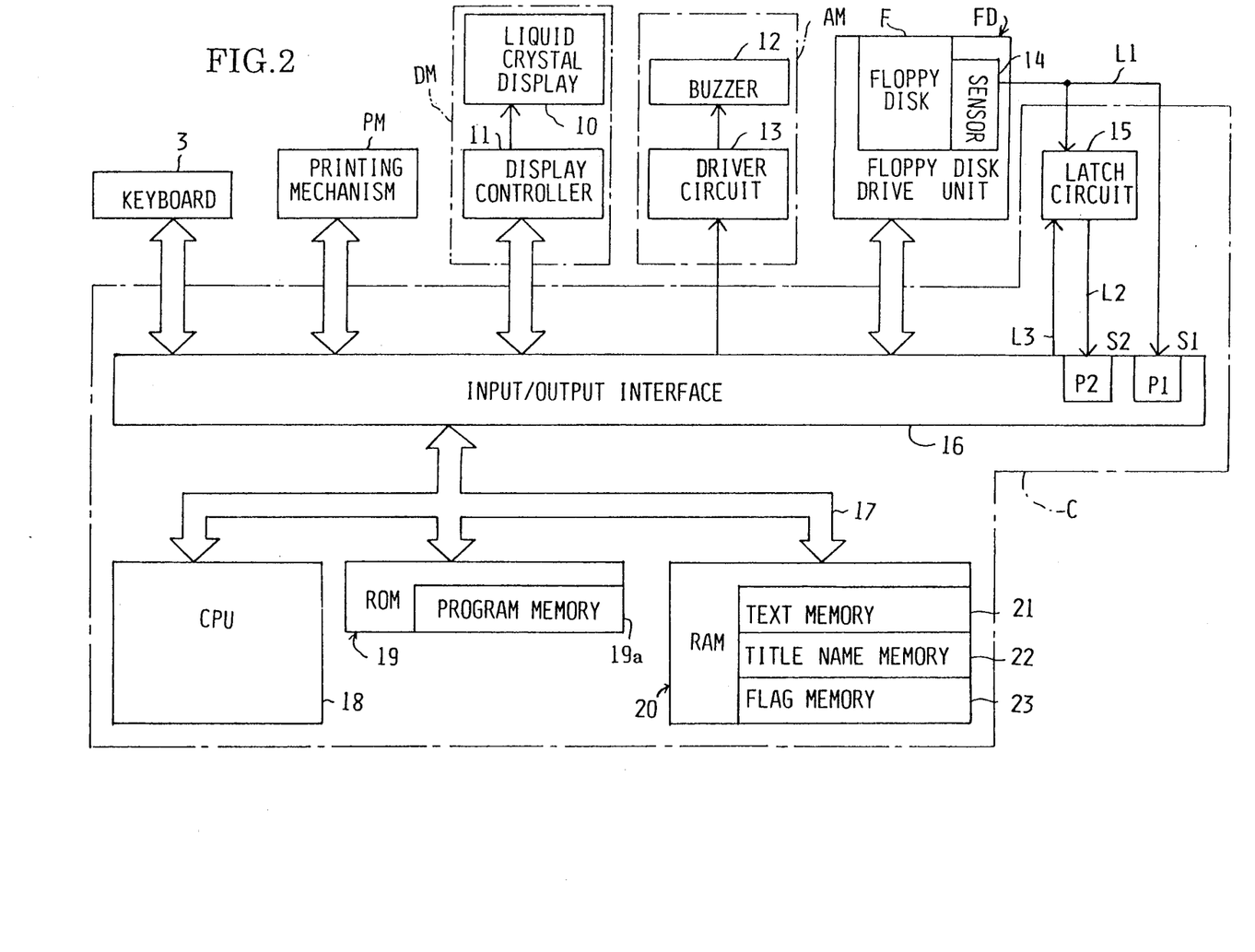
FIG. 2 is a block diagram of a control system of the word processor.

The word processor 1 includes a control system as shown in a block diagram of FIG. 2.

A display mechanism DM has a conventional construction including a liquid crystal display 10 and a display controller 11. The display controller 11 has a display RAM for outputting display data to the liquid crystal display 10 and a character generator ROM in which a large number of dot patterns of characters and symbols are stored. An alarm mechanism AM includes a buzzer 12 and a driver circuit 13 for driving the buzzer 12 to make sound.

The floppy disk drive unit FD can store data of a plurality of documents and the title names of the documents in a correlated relationship onto a floppy disk F which has been removably loaded into the floppy disk drive unit FD. Further, the floppy disk drive unit FD includes a sensor 14 constituted of a known microswitch for detecting whether a floppy disk F is loaded in the floppy disk drive unit FD.

A control device C includes a CPU 18, an input/output interface 16 connected to the CPU 18 by way of a bus 17 such as a data bus, a ROM 19 and a RAM 20.

The ROM 19 has a program memory 19a in which a control program for controlling the display mechanism DM in accordance with code data input from the keyboard 3, another control program for storing such code data into a text memory 21, a cursor movement control program for moving the cursor in response to operation of a cursor moving key, a disk access control program for executing various accessing processings to the floppy disk F including a control program for storing document data from the text memory 21 and title name data from a title name memory 22 in a correlated relationship onto the floppy disk F and reading data of a designated document from the floppy disk F.

Document data input from the keyboard 3 are stored into the text memory 21 of the RAM 20.

Data of the title name assigned to the document data are stored into the title name memory 22.

A replacement detection flag CF which is set (updated to "1", as discussed below) when the floppy disk F is replaced is stored into a flag memory 23.

Figure 3:
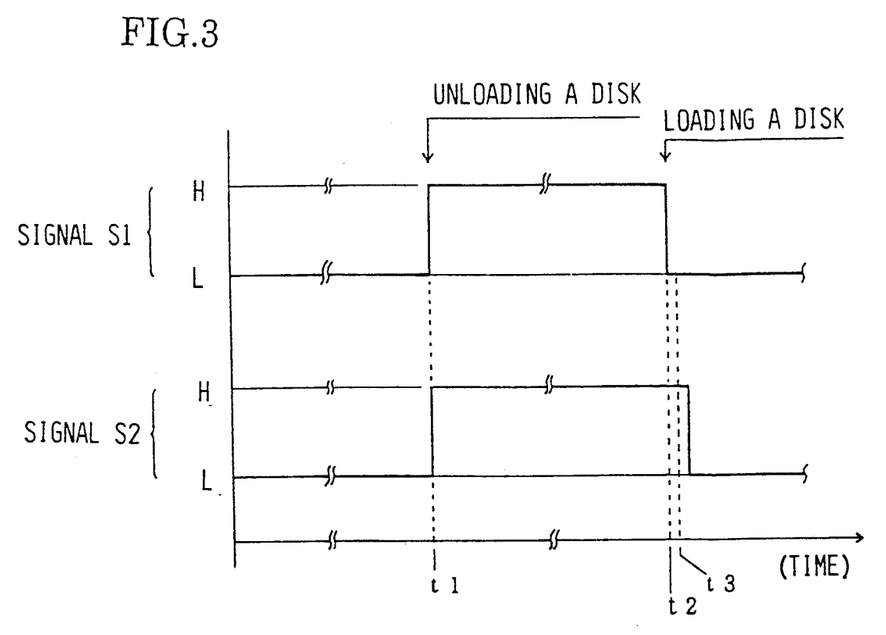
FIG. 3 is a time chart of signals S1 and S2 when a floppy disk is replaced.

Here, in order to detect replacement of the floppy disk F, a signal S1 is input to a port P1 of the input/output interface 16 while another signal S2 is input to another port P2. In particular, the sensor 14, provided in the floppy disk drive unit FD, outputs a signal S1, which presents an "L" level when a floppy disk F is loaded but presents an "H" level when the floppy disk F is unloaded, is connected to the port P1 and an input terminal of a latch circuit 15 by way of a signal line L1, and an output terminal of the latch circuit 15 is connected to the port P2 by way of another signal line L2. Accordingly, when the floppy disk F is unloaded at a point of time t1 as seen in FIG. 3, the signals S1 and S2 both present an "H" level, and when another floppy disk F is loaded at another point of time t2, only the signal S1 is changed over to an "L" level. Consequently, at a further point of time t3, the signal S1 presents an "L" level and the signal S2 presents an "H" level, and accordingly, replacement of the floppy disk F is detected. It is to be noted that the latch circuit 15 is reset (to an "L" level) by way of a further signal line L3.

Subsequently, a disk access control routine which is executed by the control device C of the word processor 1 will be described with reference to the flow charts of FIGS. 4 to 10. It is to be noted that, in those figures, Si (i=1, 2, 3, . . . ) denotes a step number.

Figure 4:
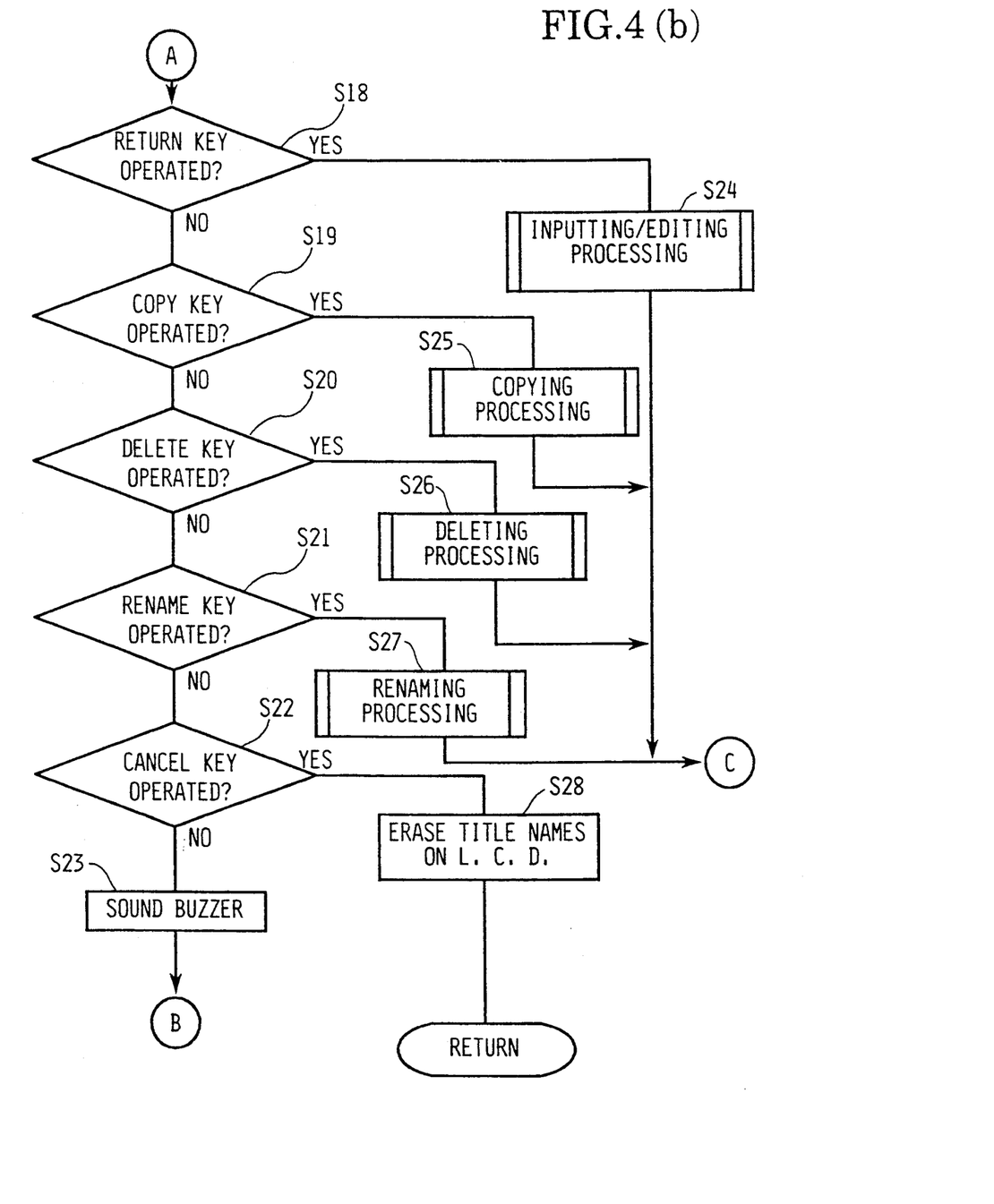
Figure 4A:
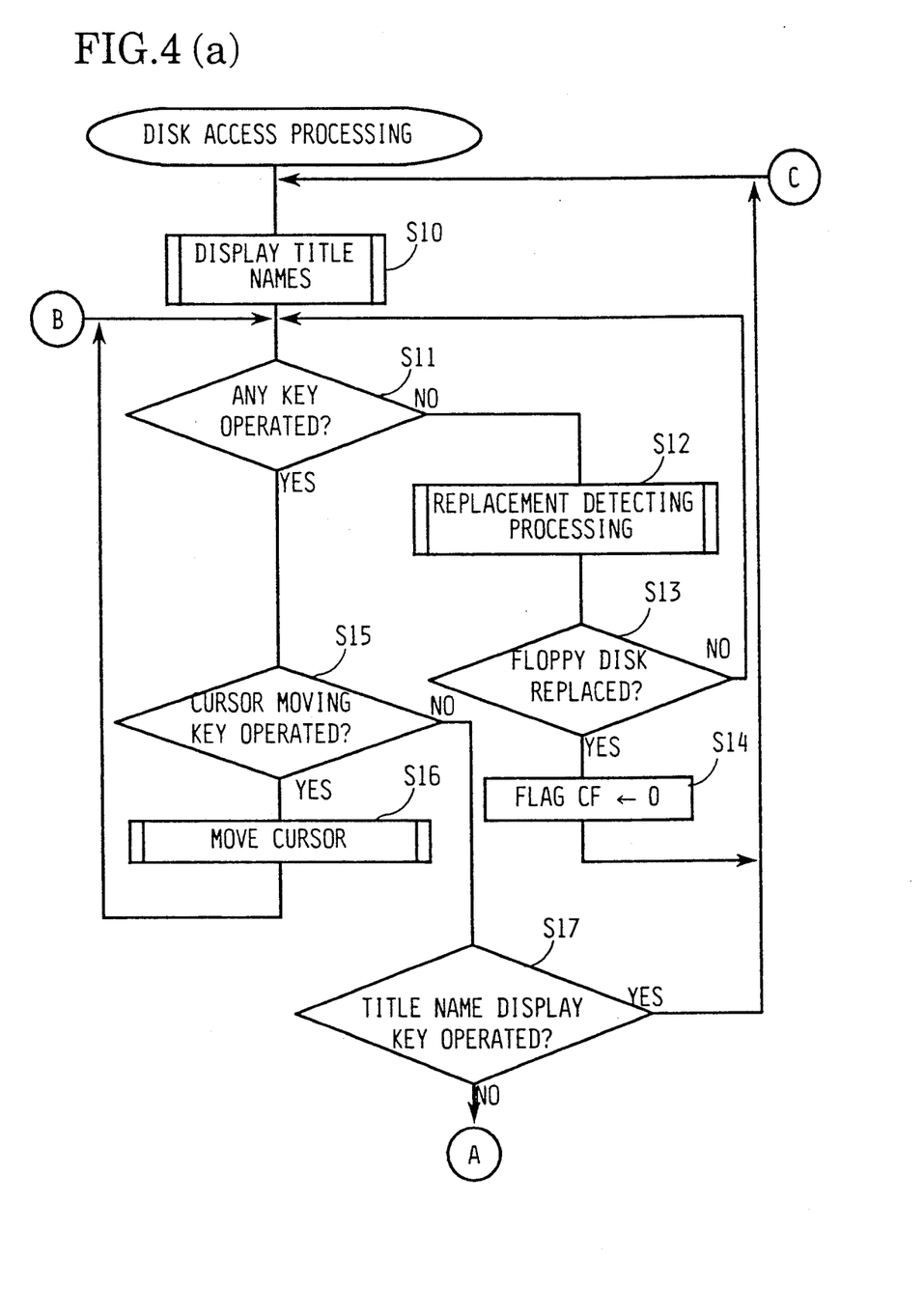

When the title name display key 3d is operated, the control is started and all title names of documents stored on a floppy disk F are read and displayed on the display 10 (S10). Then, in the case where no key of the keyboard 3 is operated (S11: No), replacement detecting processing is executed (S12). After the processing is started (FIG. 5), the signals S1 and S2 input to the two ports P1 and P2 are read (S30). When the signal S1 presents an "L" level and the signal S2 presents an "H"

level (S31: Yes, S32: Yes), the flag CF is set (S33), latch circuit 15 is reset (S34), and the control sequence returns to step S13 of the disk accessing processing (FIG. 4 (a)). If the flag CF is set in this manner, then a floppy disk F has been loaded in place of the floppy disk previously loaded (S13: Yes). Subsequently, the flag CF is reset (S14) and the program returns to step S10 where all title names of the thus newly loaded floppy disk F are read. The read new title names are then displayed in place of the title names of the preceding floppy disk F upon completion of the reading. Accordingly, immediately after the old title names have been erased from the liquid crystal display 10, the new title names are displayed simplifying things for the operator.

Figure 11:
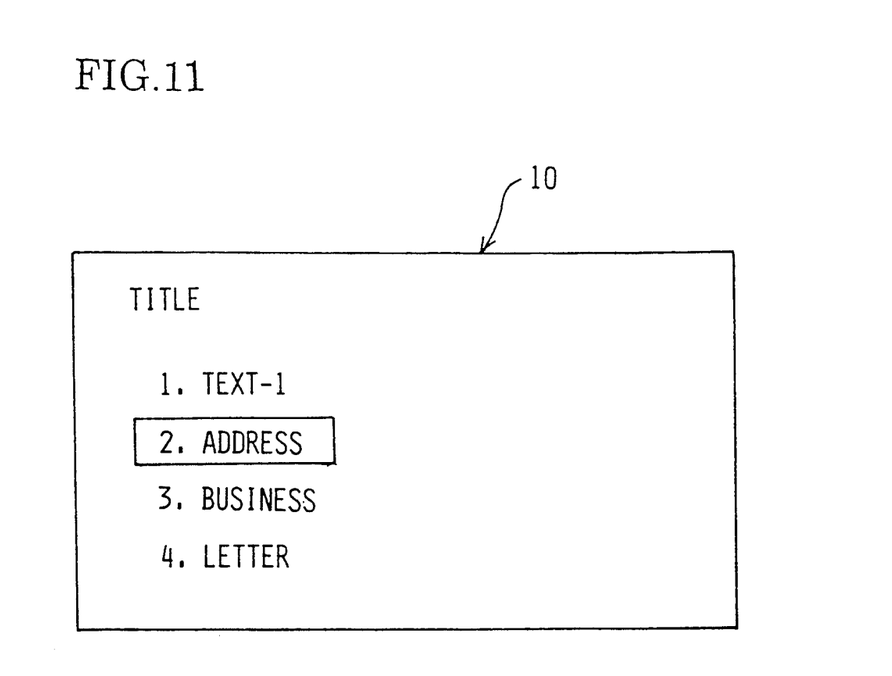
FIG. 11 is a schematic view showing a display screen on which title names of documents stored on the floppy disk are displayed.

Conversely, in the case where signal S1 presents an "H" level (S31: No) or the signal S2 presents an "L" level (S32: No), during replacement detecting processing (FIG. 5), the control sequence returns directly to step S13 of the disk accessing processing (FIG. 4 (a)) without setting the flag CF. In this instance, since the flag CF remains equal to "0", it is determined that the floppy disk F has not been replaced (S13: No) and processing enters a condition of waiting for the next operation of any key (S11).

Where one of the cursor moving keys 3c is operated during disk accessing processing (S11: Yes, S15: Yes), the cursor is moved by one line distance in the specified direction (S16). Upon operation of one of the cursor moving keys 3c, the cursor is positioned to identify a desired title name on the liquid crystal display 10, for example, as shown in FIG. 11. However, when the title name display key 3d is operated (S17: Yes), title names of the currently loaded floppy disk F are displayed (S10).

Figure 7:
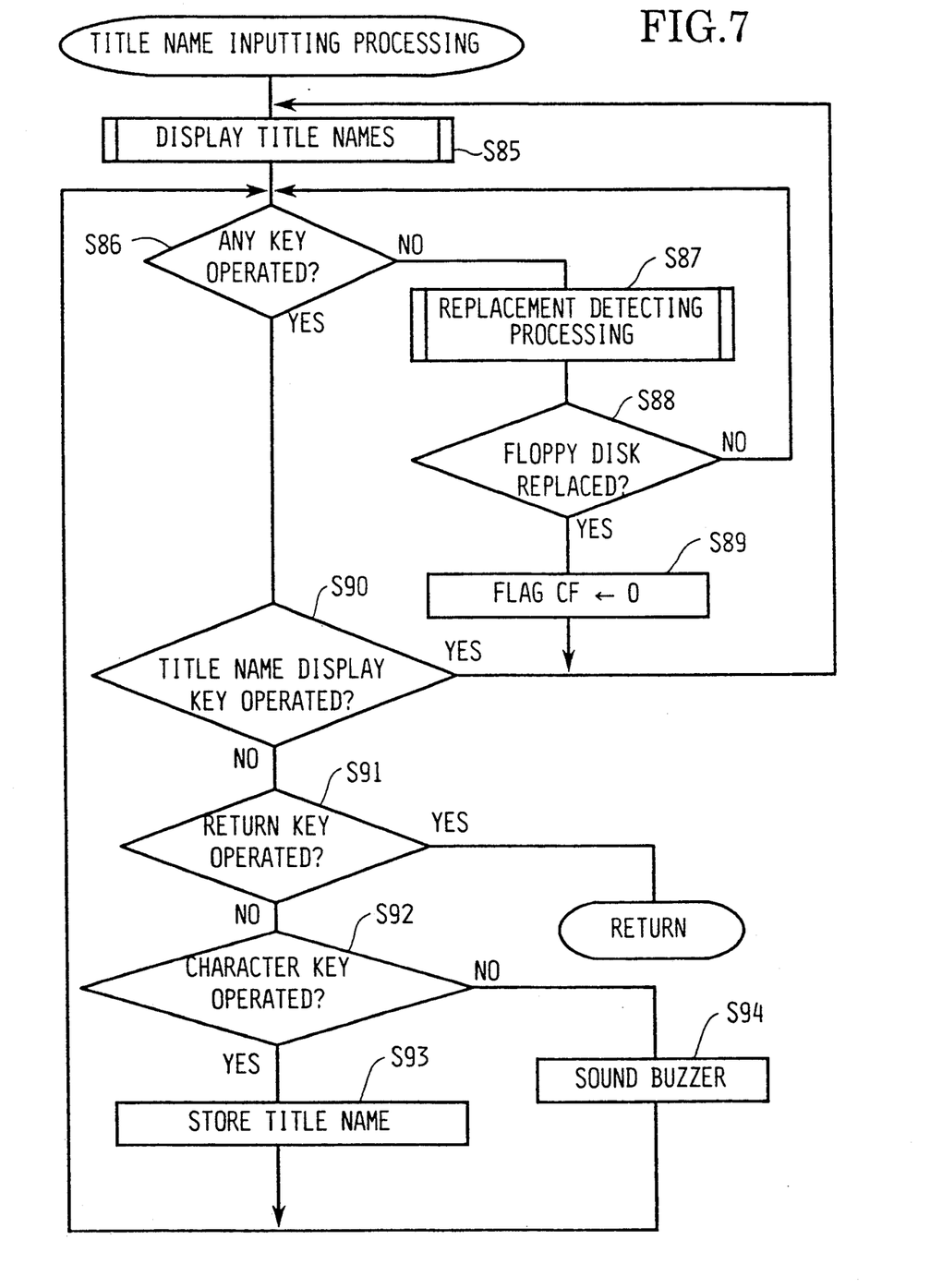
Figure 8:
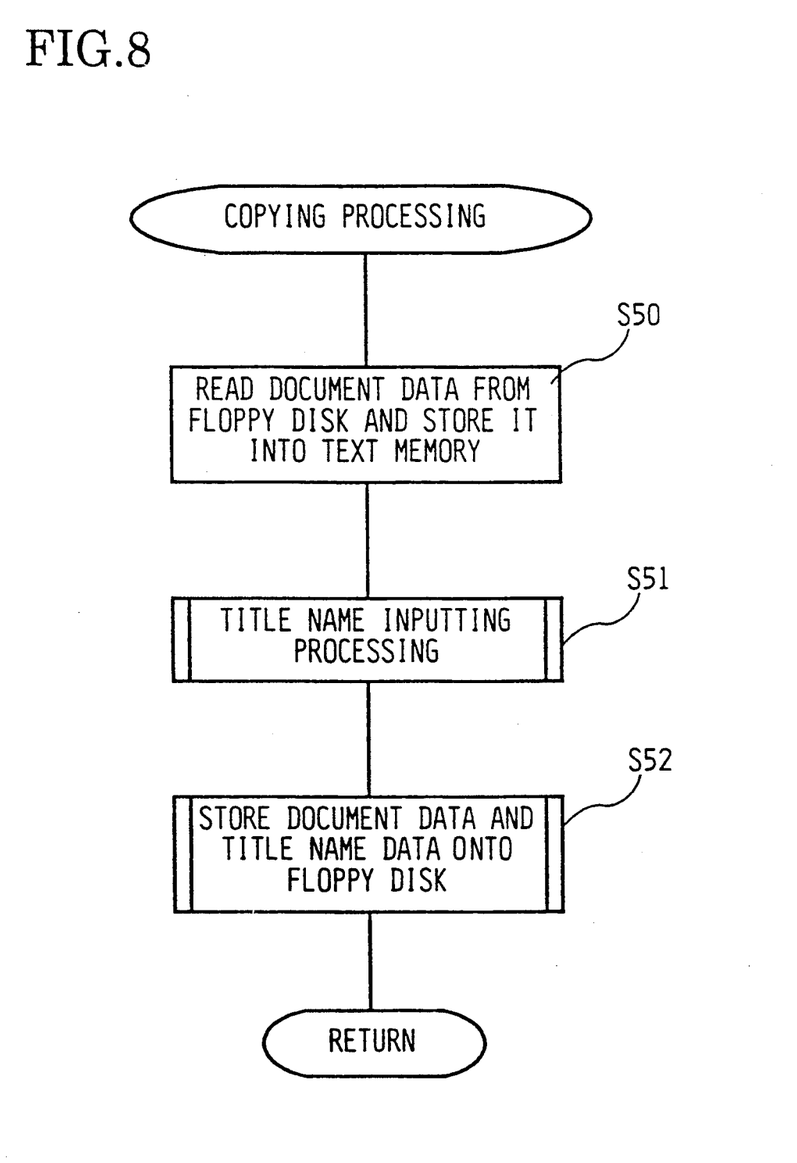
Figure 9:
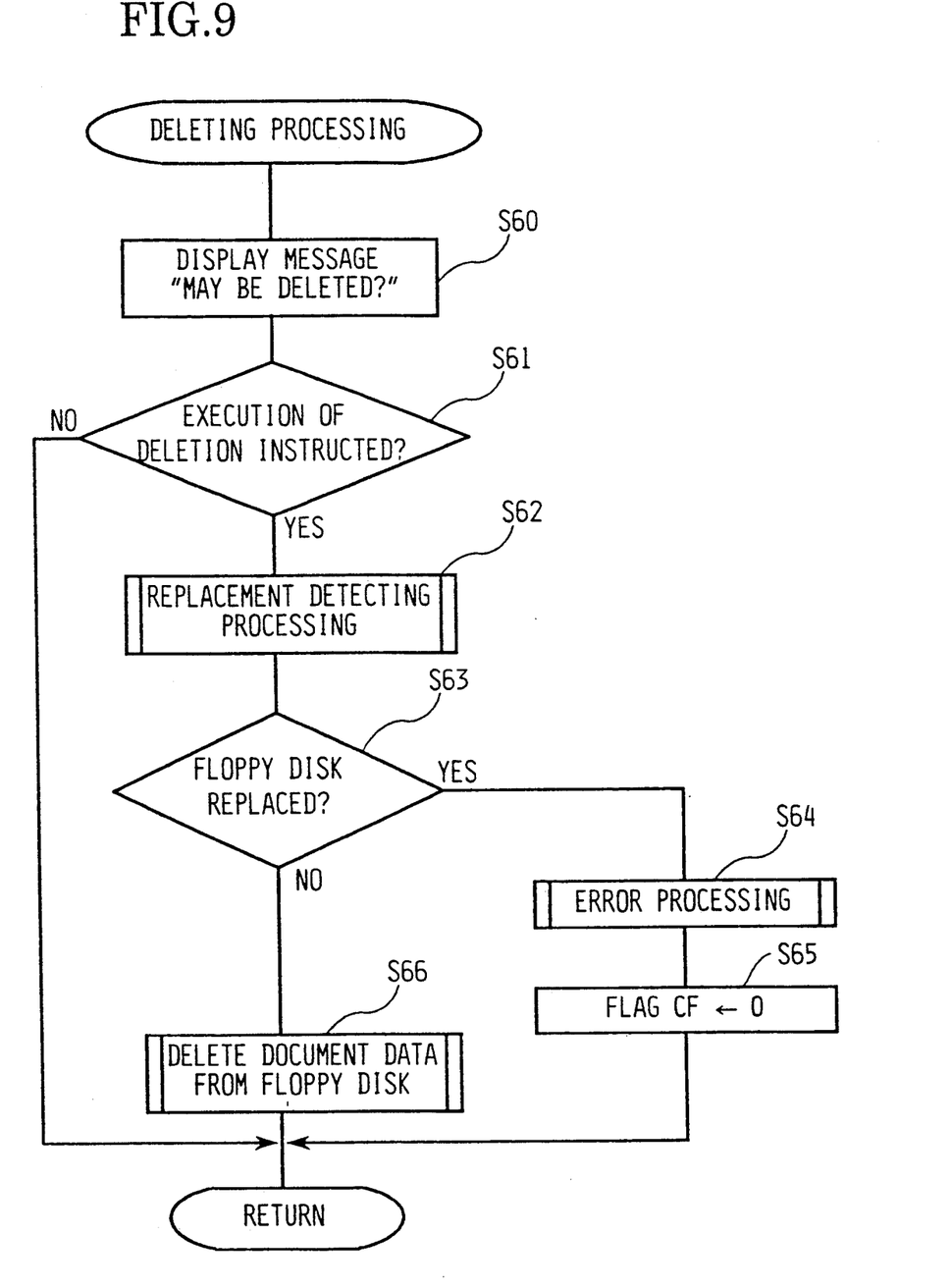
Figure 10:
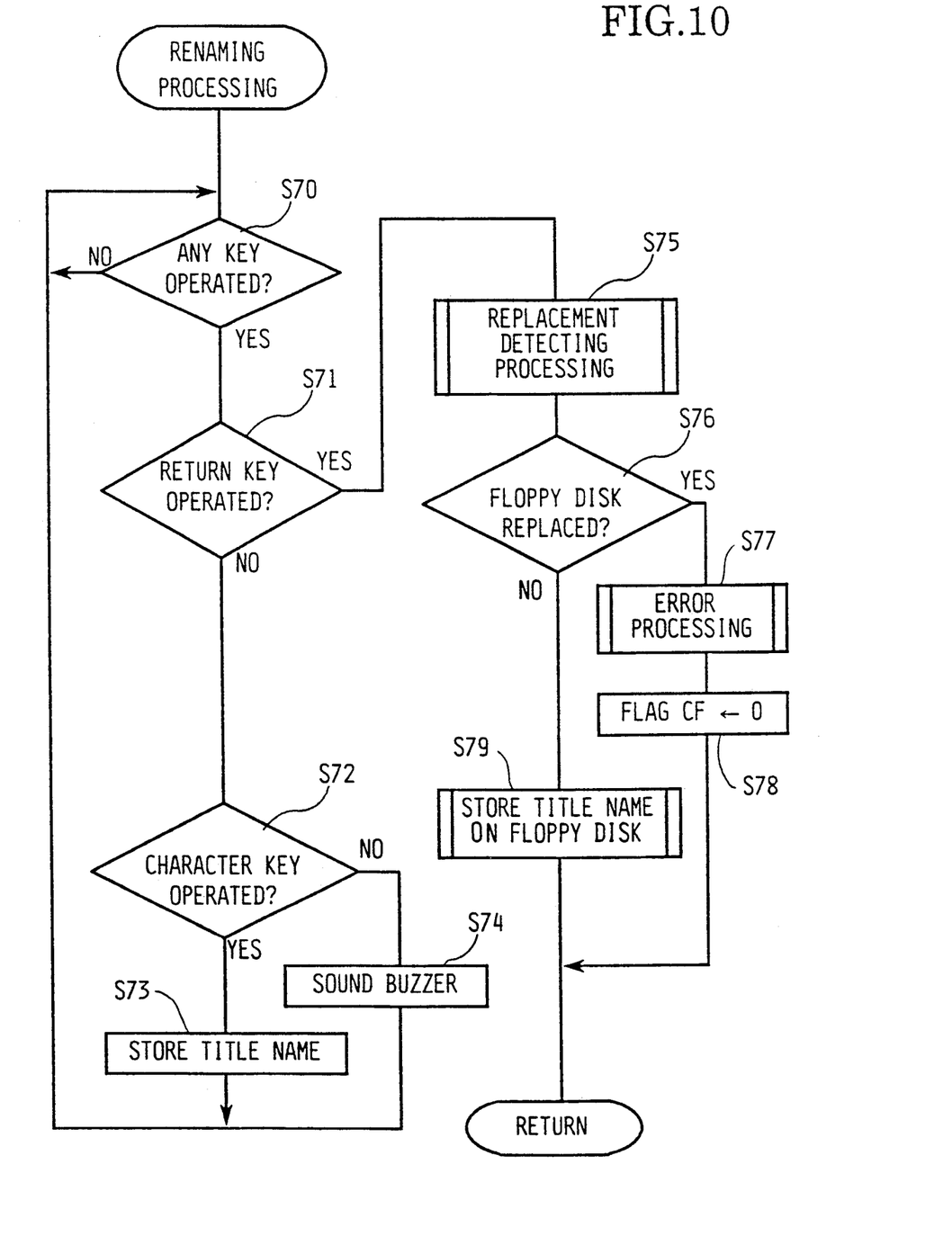

In the case where the return key 3b is operated (S18: Yes), inputting/editing processing is executed (S24). After the processing (FIG. 6) is started, if a character key or a function key is operated (S40: Yes, S41: No), editing processing is executed for the displayed input document data (S42). If the title name display key 3d is operated after the production of new document data is completed or upon completion of an editing operation (S40: Yes, S41: Yes), title name input processing is executed (S43) as shown in FIG. 7. After the processing (FIG. 7) is started, all title names on the floppy disk F currently loaded in the floppy disk drive device FD are displayed (S85), and then if no key input is detected (S86: No) and it is determined that the floppy disk F has been replaced (S87, S88: Yes), the flag CF is cleared to "0" (S89). Then, all title names of the newly loaded floppy disk F are read and displayed in place of the title names of the old floppy disk F (S85) on the liquid crystal display 10, without additional operator actions.

Conversely, when it is determined that the floppy disk F has not been replaced (S88: No), a determination of presence or absence of a key input (S86) is executed.

Further, when the title name display key 3d is operated (S86: Yes, S90: Yes), it is also determined whether or not the floppy disk F has been replaced in a manner similar to the case where no key is operated (S86: No). If it is determined that the floppy disk F has been replaced, then the title name display processing is executed. When it is determined that the return key 36 has been operated (S91: Yes), the control sequence returns to the editing processing after completion of the title name input processing.

Otherwise, when character keys are operated (S86: Yes, S92: Yes), a title name input by the operation of character keys is stored into the title name memory 22 in the RAM 20 (S93). If any key other than the title name display key 3d, return key 3b or character keys, that is. a useless key, is operated (S92: No), the buzzer is sounded to draw the attention of the operator (S94) and a waiting condition for a next key input is started (S86). After completion of the input of the title name by the operation of character keys, the control sequence returns to the inputting/editing processing in response to operation of the return key 3b (S86: Yes, S91: Yes).

After the control sequence returns to the inputting/editing processing, the document data of the text memory 21 in the RAM 20 and the title name data of the title name memory 22 are stored onto the floppy disk F (S44) completing the inputting/editing processing. After that, the control sequence returns to step S10 of the disk access processing (FIG. 4 (a)).

In the case where the copy key 3e is operated (S19: Yes), copying processing is executed (S25). After the copying processing is started (FIG. 8), the original document data corresponding to the title name which is currently specified by the cursor on the liquid crystal display 10 are read from the floppy disk F and stored into the text memory 21 in the RAM 20 (S50). Subsequently, the title name inputting processing described hereinabove with reference to FIG. 7 is executed (S51). Then, after the title name inputting processing is completed, the document data of the text memory 21 stored in the RAM 20 and the title name data stored in the title name memory 22 are stored onto the floppy disk F (S52). Consequently, the document data stored on the floppy disk F are copied and stored onto another area of the same floppy disk F. After the copying processing is completed in this manner, the control sequence returns to step S10 of the disk accessing processing (FIG. 4 (a)).

Figure 5:
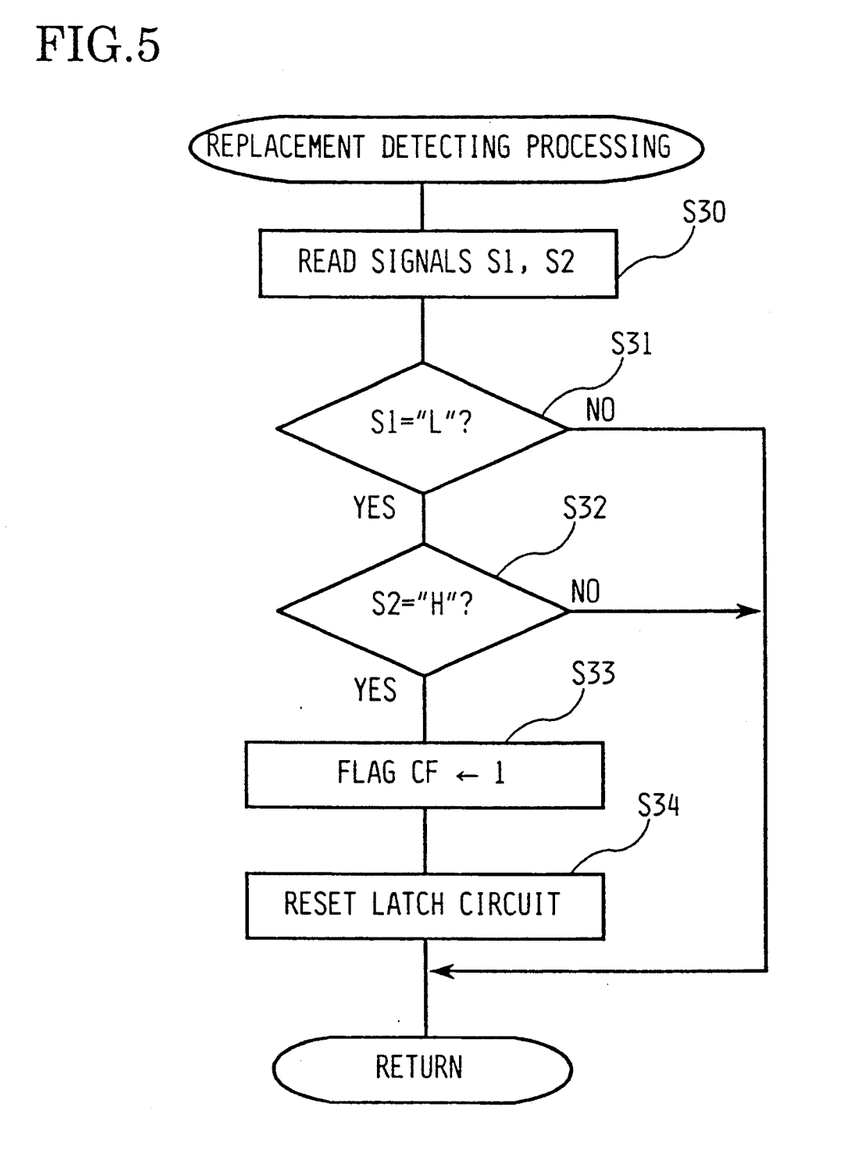
Figure 6:
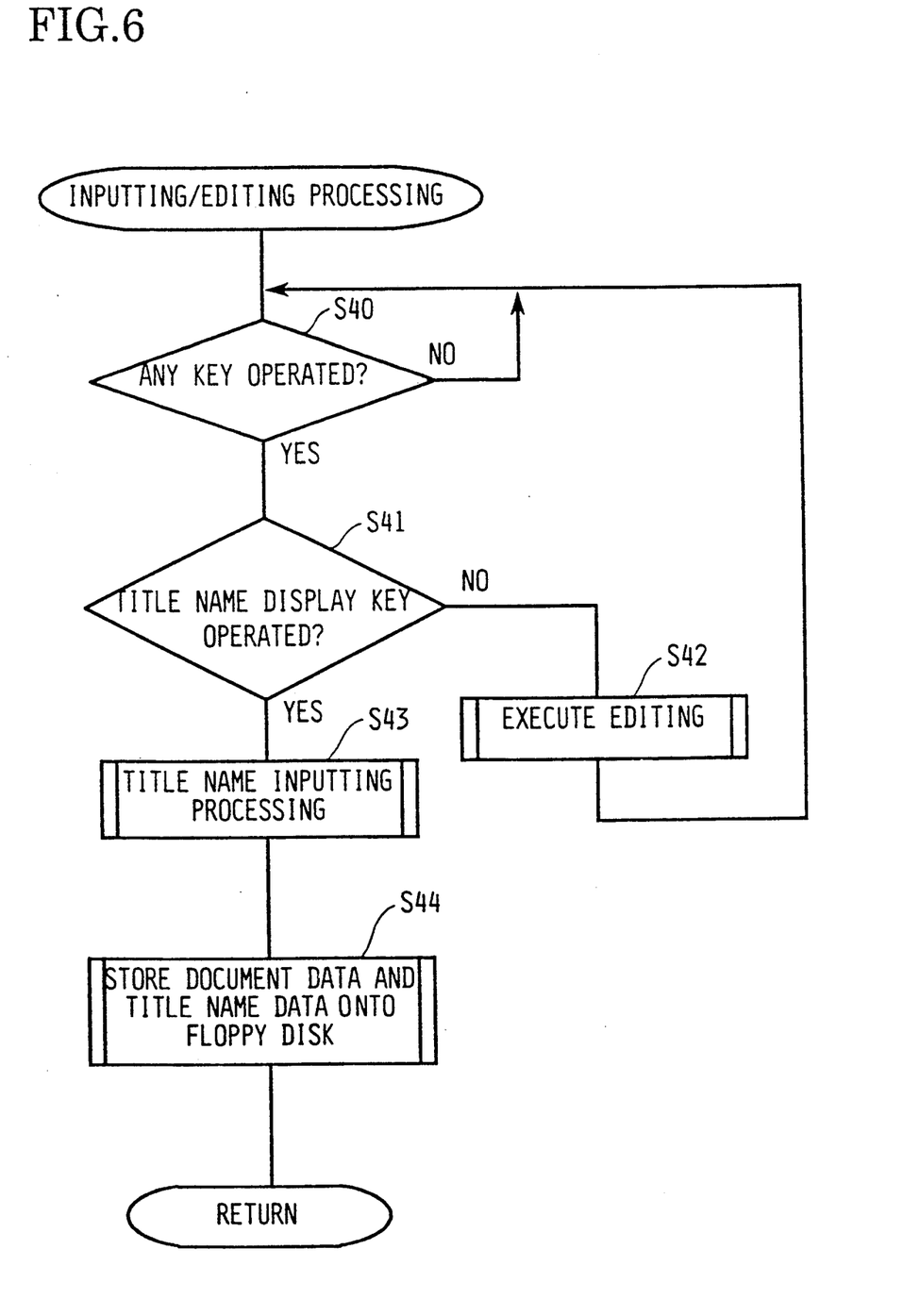

When the delete key 3f is operated (S20: Yes), deleting processing is executed (S26). After the deleting processing (FIG. 9) is started, the sentence "May be deleted?" is displayed on a message line provided on the last line position of the liquid crystal display 10 (S60). If the return key 3b is depressed in response to the question, it is determined that deletion is instructed (S61: Yes). Then, replacement detecting processing as described hereinabove with reference to FIG. 5 is executed (S62). As a result, if it is determined that the floppy disk F has been replaced (S63: Yes), error processing is executed (S64) and deletion of the document data is not executed. Subsequently, the flag CF is cleared to "0". The deleting processing is completed and the control sequence returns to step S10 of the disk access processing (FIGS. 4 (a) and (b)).

When it is determined, as a result of the replacement detecting processing (S62), that the floppy disk F has not been replaced (S63: No), document data of the title name specified by the cursor on the liquid crystal display 10 are erased from the floppy disk F (S66) and the control sequence returns to step S10 of the disk access processing (FIGS. 4 (a) and (b)).

If the cancel key 3h is depressed when the message "May be deleted?" is displayed (S60), then it is determined that execution of deleting processing is canceled (S61: No) and the control sequence returns to step S10 without deleting the document data.

When the rename key 3g is operated (S21: Yes), renaming processing is executed (S27). After the renaming processing (FIG. 10) is started, if character keys are operated (S70: Yes, S71: No, S72: Yes), a new title name input by the operation of character keys is stored into the title name memory 22 in the RAM 20 (S73). On the other hand, if a key other than the return key 3b and character keys is operated (S72: No), the buzzer 12 is sounded to draw the attention of the operator (S74) and a waiting condition for a next key input (S70) is entered. If the return key 3b is operated after completion of inputting of a new title name using the character keys (S71: Yes), the replacement detecting processing described hereinabove with reference to FIG. 5 is executed (S75). Then, if it is determined that the floppy disk F has been replaced (S76: Yes), the renaming processing is stopped at error processing (S77), the flag CF is cleared to "0" (S78) and then the control sequence returns to step S10 of the disk access processing (FIGS. 4 (a) and (b)).

On the other hand, if it is determined that the floppy disk F has not been replaced (S76: No), the title name stored on the floppy disk F is replaced by the title name stored in the title name memory 22 in the RAM 20 (S79) and then the control sequence returns to step S10.

When cancel key 3h is operated in the disk access processing (S22: Yes), the listing of the title names is erased from the liquid crystal display 10 (S28) and the control sequence returns to a main routine. If, at this time, a non-functional key is operated, the buzzer 12 sounds (S23) to draw the attention of the operator and then a waiting condition for a next key input is started (S11).

Since, each time a floppy disk F is replaced, all title names stored on the newly loaded floppy disk F are automatically displayed, no key operation is required of the operator. Accordingly, the control sequence advances readily and rapidly to initiate desired processing such as storage or reading of a document, setting or changing of a title name or the directed processing, and operability is improved remarkably.

It is to be noted that the present invention, although disclosed in terms of using a floppy disk as the recording medium, can be applied widely to various data processing systems including word processors or computers wherein document data can be stored on any replaceable memory, such as tapes, magnetic disks, replaceable IC cards, or laser disks, having an associated read/write unit.

What is claimed is:

1. A data processing apparatus, comprising:
   input means for inputting characters composing document data and a title name of the document;
   recording medium removably loaded for storing thereon the document data and the title name of the document data of at least one document in a correlated relationship;
   display selection means for initiating the display of the title names of the document data stored on the recording medium;
   display means for displaying one of the document data and information related to the document data;
   display controlling means for reading the title names from the recording medium and controlling the display means to display the read title names;
   detecting means for subsequently detecting whether or not a replacement recording medium is newly loaded and for generating a signal indicating the result of the detection; and
   instructing means for instructing the display controlling means to control the display means to display all title names read from the newly loaded replacement recording medium after the recording medium is newly loaded based on the signal generated from the detection means.

2. The data processing apparatus according to claim 1, said detecting means further comprising means for generating a signal indicating the result of the detection.

3. The data processing apparatus according to claim 1, said detecting means further comprising:
   unloading detecting means for detecting an unloading of said recording medium; and loading detecting means for detecting a loading of said replacement recording medium wherein, said detecting means determines that said replacement recording medium is newly loaded when said loading detecting means detects the loading of said replacement recording medium after said unloading detecting means has detected the unloading of said recording medium.

4. The data processing apparatus according to claim 3, said detecting means further comprising:
   sensor means for sensing whether said recording medium is loaded or unloaded and for generating one of two types of sensing signals, each of the sensing signals corresponding to a sensing result;
   latch means for latching the sensing signal of a second type generated by said sensor means after said sensor means has generated the sensing signal of a first type; and
   reset means for setting said latch means to output the same signal as the sensing signal corresponding to loading of said replacement recording medium when a predetermined time lapses after said sensor means has generated the sensing signal corresponding to loading of said replacement recording medium, wherein said detecting means determines that said replacement recording medium is newly loaded when said sensor means generates the sensing signal corresponding to loading of said replacement recording medium on a condition that said latch means latches the sensing signal corresponding to unloading of said recording medium.

5. The data processing apparatus according to claim 2, said detecting means further comprising:
   an unloading detecting means for detecting an unloading of said recording medium; and a loading detecting means for detecting a loading of said replacement recording medium, and wherein, said detecting means determines that said replacement recording medium is newly loaded when said loading detecting means detects the loading of said replacement recording medium after said unloading detecting means has detected the unloading of said recording medium.

6. The data processing apparatus according to claim 5, said detecting means further comprising:
   sensor means for sensing whether said recording medium is loaded or unloaded and for generating one of two types of sensing signals, each of the sensing signals correspond to a sensing result;
   latch means for latching the sensing signal of a second type generated by said sensor means after said sensor means has generated the sensing signal of a first type; and
   reset means for setting said latch means to output the same signal as the sensing signal corresponding to loading of said replacement recording medium when a predetermined time lapses after said sensor means has generated the sensing signal corresponding to loading of said replacement recording medium, wherein said detecting means determines that said replacement recording medium is newly loaded when said sensor means generates the sensing signal corresponding to loading of said replacement recording medium on a condition that said latch means latches the sensing signal corresponding to unloading of said recording medium.

7. The data processing apparatus according to claim 6, wherein said display controlling means reads all of the title names stored on said recording medium and controls said display means to display all of the read title names.

8. The data processing apparatus according to claim 1, wherein said display controlling means reads all of the title names stored on said recording medium and controls said display means to display all of the read title names.

9. The data processing apparatus according to claim 1, wherein said recording medium comprises a diskette and said display controlling means has a diskette drive means for reading data from and storing data on the diskette.

* * * * *